June 25, 1963  H. W. MORGAN ETAL  3,094,792
EDUCATIONAL TOY
Filed March 28, 1962  2 Sheets-Sheet 1
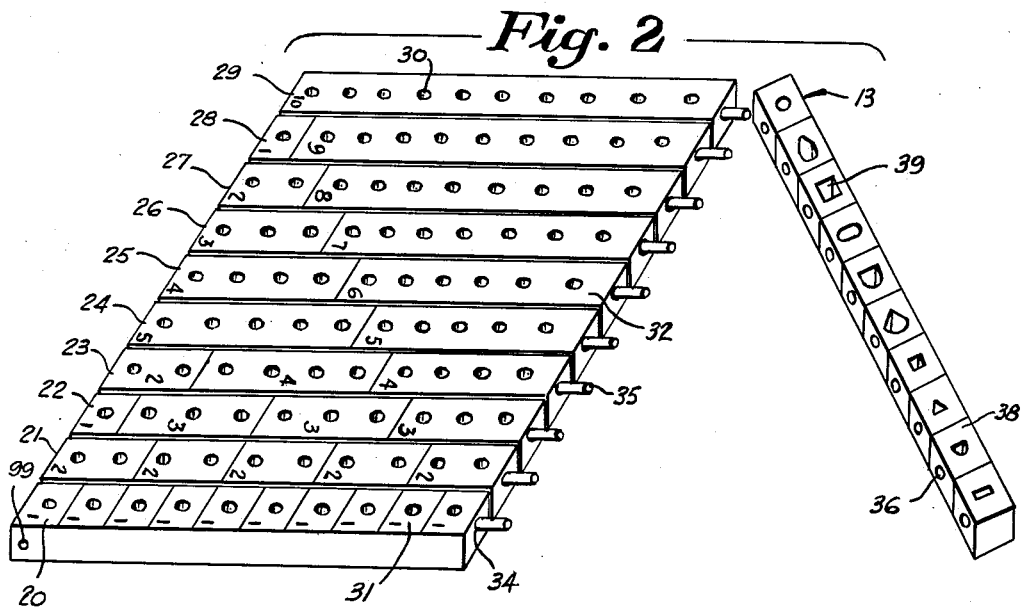
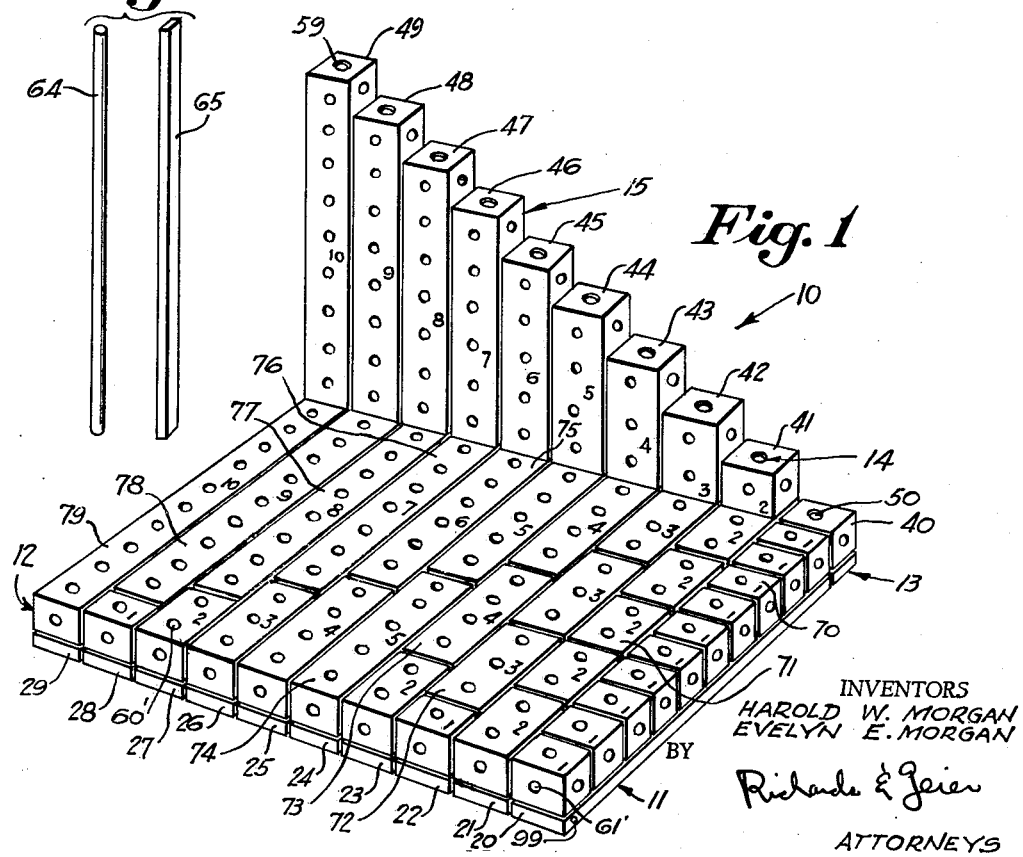
INVENTORS
HAROLD W. MORGAN
EVELYN E. MORGAN
BY Richards & Geier
ATTORNEYS June 25, 1963  H. W. MORGAN ETAL  3,094,792
EDUCATIONAL TOY
Filed March 28, 1962  2 Sheets-Sheet 2
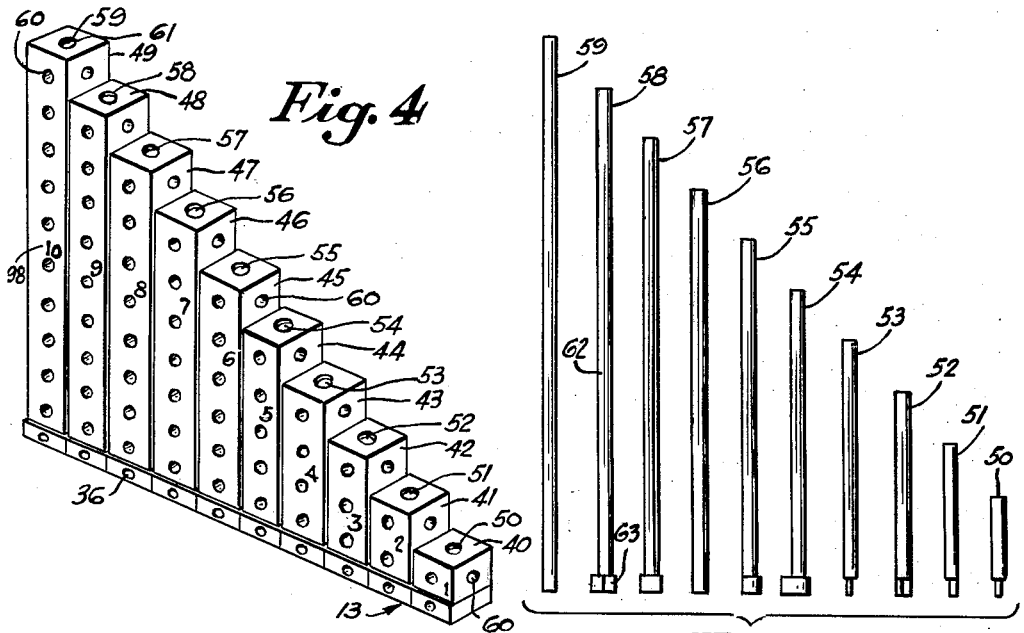
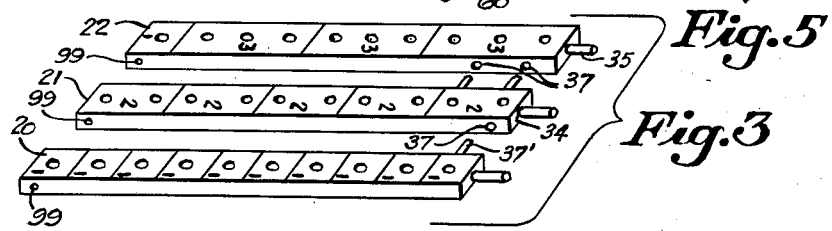
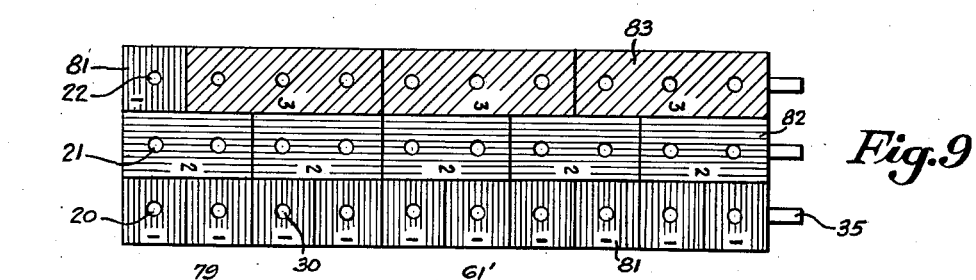
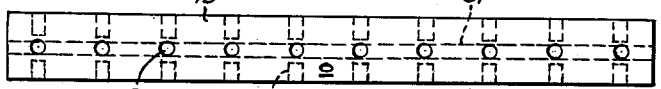
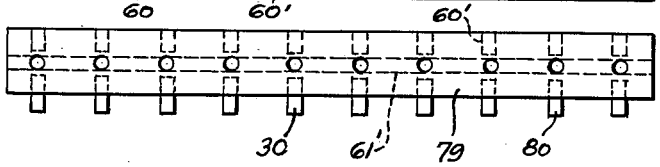
INVENTOR.
HAROLD W. MORGAN
EVELYN E. MORGAN
BY Richards & Geier
ATTORNEYS

United States Patent Office 3,094,792
Patented June 25, 1963

3,094,792
EDUCATIONAL TOY
Harold W. Morgan and Evelyn E. Morgan, both of 2206 E. Buchanan, Phoenix, Ariz.
Filed Mar. 28, 1962, Ser. No. 183,171
12 Claims. (Cl. 35—31)

This invention relates to an educational toy and refers more particularly to a toy block set in which the blocks can be manipulated to illustrate the arithmetical relationships of addition, subtraction, multiplication and division.

It is well known that visual aids when properly and appropriately used, advantageously supplement more formal teaching methods. This is particularly true in the teaching of children whose interest is stimulated when they are shown a tangible example of the subject matter being taught. It is further evident that greater interest may be culled in a child when he sees that the visual aid has the added utility of being a play toy.

It is, therefore, the primary object of the present invention to provide a toy block set which can be used for teaching the fundamental principles of arithmetic.

Another object is to provide a toy block set which is an educational aid.

A further object of the present invention is to provide a toy block set in which the toy blocks are of different size and color for the purpose of vividly illustrating different numerical values.

A still further object is to provide an entertaining play toy for a child.

A still further object is to provide a toy block set which is easy and cheap to make and which is not easily damaged.

Other objects of the present invention will become apparent in the course of the following specification.

In achieving the aforementioned objectives of the present invention, it was found advantageous to provide a toy block set which has a flat base board comprised of a number of identical interlocking column strips arranged in alongside adjacent relation to each other. Along one margin of the base board a guide strip is connected thereto at the ends of each column strip. The upper surface of each column strip has a row of evenly spaced peg holes whereby blocks may be connected to each column strip by means of pegs and each column strip is used to designate a different number from one to ten. Also the blocks are made in different lengths so that there are blocks in lengths of from one unit to ten units. The column strip designated as number one carries ten blocks each one unit in length. The number two column strip carries five blocks each two units in length, and so on with each succeeding numbered strip carrying at least one block which has a unit length equal to the number designation of the column strip. Further, each succeeding column strip carries an additional block or blocks of sufficient unit length to provide that the length of the blocks on each column strip totals ten units. To further differentiate the different value designations of the column strips and blocks, each strip and each block of a particular value is colored differently from the other strips and blocks.

The guide strip is divided into ten units, each unit corresponding to the width of one of the column strips and being colored the same as that column strip. The guide strip also has ten stake holes, one in each unit, wherein is mounted a vertical stake. The stakes are of different heights starting with a height of one unit adjacent the first column strip and so on until the last stake is ten units high. The stakes support upright blocks with each block having a unit height corresponding to that of the stakes. The stakes and blocks are likewise colored to correspond to the color of the adjacent column strip.

In use the blocks may be manipulated at will to designate simple addition, subtraction, etc. Furthermore, each block has a number of peg holes so that the blocks may also be connected to one another by means of pegs.

The invention will appear more clearly from the following detailed description when taken in conjunction with the accompanying drawings showing, by way of example, the preferred embodiments of the inventive concept.

In the drawings:

FIGURE 1 is a perspective view of an educational toy constructed in accordance with the principles of the present invention.

FIGURE 2 is a perspective view of the column strip and guide strip assembly.

FIGURE 3 is a perspective view of several column strips showing the manner in which they are interlocked.

FIGURE 4 is a perspective view of the guide strip and the upright blocks which may be attached thereto.

FIGURE 5 is an elevational view of a set of the upright stakes which are mounted in the guide strip to support the upright blocks thereon.

FIGURE 6 is a perspective view showing several variations in the construction of the upright stakes.

FIGURE 7 is a top plan view of one of the blocks which may be attached to the column strip assembly or on one of the upright stakes and shows the pegs used for connecting the block to a column strip or another block.

FIGURE 8 is a side view of FIGURE 7.

FIGURE 9 is a plan view on enlarged scale of several interconnected column strips showing the different colors on each strip employed to designate different number values.

Throughout the specification like reference numerals are used to designate like parts.

A fully assembled toy 10 of the present invention is shown in FIGURE 1 of the drawing. It comprises a plurality of interconnected column strips 11, a plurality of number blocks 12 which may be removably connected to the column strips, a guide strip 13 which is connected to the ends of the column strips, a plurality of upright stakes 14 removably mounted in the guide strip and a plurality of upright blocks 15 removably supported on the upright stakes.

Referring now to FIGURE 2, the column strips 20, 21, 22, 23, 24, 25, 26, 27, 28 and 29 are identical in shape. Each column strip has ten uniformly spaced peg holes 30 by means of which the after described number blocks may be connected thereto, the peg holes 30 of the interconnected column strips being arranged in longitudinally and transversely aligned rows. Each column strip is used to designate a different number from one to ten, and for that purpose the upper surface of each column strip is divided in one or more spaces 31 which in length are equivalent to the units of the designated number. Thus, column strip 20 has ten spaces each one unit in length, column strip 21 has five spaces each two units in length, etc. Since, however, all column strips are ten units long, it is necessary to use additional complementary spaces on some of the column strips. For example, column strip 25 which is used to designate the number six, has a space 32 which is six units in length, but it also has a complementary space 33 which is only four units in length. One end of each column strip has a blind hole 34 wherein may be inserted a connector peg 35 for connecting the guide strip 13 to the interconnected column strips. For this purpose the guide strip 13 has ten equispaced connector peg holes 36.

The manner of interconnecting the column strips is illustrated in FIGURE 3. One side of each column strip, except for column strip 20, has one or more peg holes 37 which are adapted to receive the pegs 37' carried in the immediate side of the preceding column strip. Each succeeding column strip, starting with strip 21, has one more peg hole 37 than the preceding column strip. Thus, column strip 21 is connected to column strip 20 by means of one peg 37', column strip 22 is connected to strip 21 by means of two pegs 37' and so on until finally column strip 29 is connected to column strip 28 by means of nine pegs 37'. When properly interconnected, the column strips present a flush, contiguous upper surface. If desired, the column strips may be further secured by passing a thin rod (not shown) through the side holes 99 in each column strip.

Referring once again to FIGURE 2, the guide strip 13 is divided into ten equal spaces 38, the spaces being equal in length to the width of each column strip. The upper surface of the guide strip also has ten stake sockets 39 which are adapted to receive the after described upright stakes. As seen in FIGURE 2, in this form of the guide strip 13, the stake pockets 39 have differing shapes, no two pockets being alike. The reason for this will become more apparent later on in the specification.

FIGURE 4 shows a set of upright blocks 40, 41, 42, 43, 44, 45, 46, 47, 48 and 49 which are supported, respectively, on upright stakes 50, 51, 52, 53, 54, 55, 56, 57, 58 and 59, which in turn fit in the stake pockets 39 of guide strip 13. Upright block 40 is equal in height to the length of one unit space 31 on column strip 20. Upright block 41 is one unit higher or a total of two units corresponding to the space length of column strip 21. Each succeeding upright block is one unit higher until the last upright block 49 has a height of ten units or the equivalent of the length of guide strip 29 (FIG. 2).

Each upright block has in four of its sides one or more peg holes 60, there being in each side of each block, as many peg holes as there are units in the height of the block. Each block also has a through hole 61 which extends through the remaining two (end) faces of the block. The holes 61 are used to fit the upright blocks over the upright stakes.

Each of the upright stakes shown in FIGURE 5 has a shank portion 62 and a base portion 63. The base portions 63 which fit in the stake pockets 39 of guide strip 13 are of a different shape for each of the upright stakes. Thus the upright stakes will fit in only the stake pocket which is aligned with column strip that has the same numeral unit designation as the units in the height of the stake. For example, upright stake 58 which has a shank height of nine units will fit only in the stake pocket 39 of guide strip 13 which is lined up with column strip 28, that is the column strip representing the number nine.

FIGURE 6 illustrates several variations in the construction of the upright stakes. The stake 64 is of uniform diameter from top to bottom and has a circular cross section. If stakes of this character were used instead of those shown in FIGURE 5, the stakes could be used interchangeably in the stake pockets 39 of guide strip 13. Unlike the stakes shown in FIGURE 5, a stake 64 which is nine units high could, for example, be alined alongside the column strip 22 representing the numeral three. The stake 65 (FIG. 6) differs to the extent that it has a square cross section. However, the stakes 65 would like those previously described be made in heights of increasing order. If stakes 65 were used, the stake pockets 39 in the guide strip would be square and the holes 61 in the upright blocks would also have a square shape.

Referring again to FIGURE 1 of the drawing, it is seen that the toy 10 includes in addition to the previously described upright blocks 15, a set of number blocks 12. The number blocks include one or more blocks, 70, 71, 72, 73, 74, 75, 76, 77, 78 and 79, representing, respectively, numbers from one to ten. Each of these number blocks, like the previously described upright blocks, has peg holes 60' in each of four sides in a number equivalent to the number designation of the block. Further, each block has through holes 61' extending through the other two (end) faces. The blocks are connected to the column strips by means of pegs 80 which fit the peg holes 30 in the column strips and the holes 60' in each block as shown in FIG. 8. The blocks may also be connected to each other in the same manner.

A complete set of number blocks includes ten number one blocks 70 mounted on their associated column strip 20; five number two blocks 71 mounted on column strip 21; three number three blocks 72 and a number one block 70 (complementary) mounted on column strip 22; two number four blocks 73 and a number two blocks 72 (complementary) mounted on column strip 23; two number five blocks 74 mounted on column strip 24; one number six block 75 and a number four block 73 (complementary) mounted on column strip 25; one number seven block 76 and a number three block 72 (complementary) mounted on column strip 26; one number eight block 77 and a number two block 71 (complementary) mounted on column strip 27; one number nine block 78 and a number one block 70 (complementary) mounted on column strip 28; and one number ten block 79 mounted on column strip 29.

In order to further differentiate the numerical quantities associated with the toy, the guide strip upper surfaces are colored, each of the spaces related to a particular number from one to ten, being of a different color. Thus, guide strip 20 has ten blue spaces 81, guide strip 21 has five red spaces 82, guide strip 22 has three green spaces 83 and one blue space 81, and so on with each space of increasing length on the guide strips being of different color. The colors associated with the different numbers could, for example be: yellow for number four; black for number five; brown for number six; pink for number seven; gray for number eight; purple for number nine and white for number ten. In keeping with the color-number association, the ten spaces 38 on guide strip 13 are also of different colors. The space 38 alongside column strip 20 is blue inasmuch as column strip 20 denotes the number one. The adjacent space 38 which aligns with column strip 21 is red and so on. In addition, the number blocks, upright blocks and upright stakes are colored according to their unit lengths and heights. Thus, the number block 70, upright block 40, and upright stake 50 all being one unit long or high, are colored blue.

The various pegs used for connecting the blocks, column strips and guide strip are, as previously stated, removable from the elements with which they are used. Thus, one of the upright blocks can be fitted with pegs and be mounted on top of one of the number blocks 12 or on a column strip. However, the pegs having different function have different sizes. The smallest pegs are the pegs 80 used to connect the blocks to the guide strips and to each other. The next larger size pegs are the pegs 37' used for attaching the column strips to each other. The next larger size pegs are the connector pegs 35 used for connecting the column strips to the guide strip. The upright stakes are of larger diameter than any of the mentioned pegs.

The upright blocks 15, number blocks 12 and column strips 11 each are marked with indicia 98 denoting appropriate numerical values.

In use:
The toy 10 of the present invention is intended to be used primarily as an educational aid in teaching children the rudiments of arithmetic. In the course of manipulating the toy, a child will see concrete examples of arithmetical quantities and relationships. Thus, if the child places two number one blocks 70 alongside a number two block 71, there will be exhibited to him that fact that two ones equal two. The indicia 98 on the blocks will aid in identifying the various number quantities and the concept of addition will be easily understood. Likewise, the principle of subtraction will be easily understood as the child will see if one number one block is removed that one subtracted from two equals one.

Since the arithmetic operations of division and multiplication fundamentally consist of addition and subtraction, the child will learn these operations by playing with the toy and observing and becoming familiar with the various numbers. Again referring to the above example, if the child takes first one number one block away from alongside the number two block and then removes the remaining block, he will see that one can be subtracted from two, two times. Since, however, division is the process of ascertaining how many times a divisor can be subtracted from a dividend to reduce the dividend to zero, the child will readily perceive the principle of division.

Beyond its use as an educational aid, the toy 10 also serves as a play toy, so that the child may build with the blocks any of the fanciful structures that occur in the play instinct of his mind as, for example, a house, bridge or tunnel.

The toy of the present invention may be made of various materials as, for example, wood. In addition, it could easily be made of plastic in which case the blocks, guide strips, etc. could be made hollow for lightness, which is of particular advantage in reducing the hazard that a child may accidentally hurt himself with a heavier solid block, etc.

While there is disclosed but one embodiment of the toy of the present invention, it is possible to produce still other embodiments without departing from the inventive concept herein disclosed.

What is claimed is:

1. An educational toy block set comprising a plurality of elongated column strips connected together in alongside adjacent relation and constituting a playing board having a flat upper surface and parallel sides, an elongated guide strip connected to one side of said playing board and extending transversely of the direction of said column strips, upright blocks mounted on said guide strip in alongside alignment with each of said column strips, each of said upright blocks having a height different than the height of any other upright block, and number blocks mounted on said playing board and extending in the same direction as said column strips, each of said column strips carrying at least one number block of a length corresponding to the height of the upright block which is aligned therewith.

2. An educational toy block set comprising a plurality of elongated column strips, means connecting said column strips together in alongside adjacent relation whereby they constitute a playing board having a substantially flat upper surface and parallel sides, an elongated guide strip connected to one side of said playing board, said guide strip extending transversely of the direction of and lying in the same plane as said column strips, upright blocks mounted on said guide strip in alongside alignment with each of said column strips, one of said upright blocks having a height equal to the length of the column strip in alignment therewith, the remaining upright blocks being of progressively lesser height than the first-mentioned upright block, and number blocks mounted on said playing board on each of the column strips thereof and extending in the same direction as said column strips, each of said column strips carrying at least one number block of a length corresponding to the height of the upright block which is aligned therewith.

3. An educational toy block set comprising a plurality of elongated column strips, each of said column strips having an upper surface containing at least one space of a predetermined length designating a selected numerical value, means connecting said column strips together in alongside adjacent relation whereby they constitute a playing board having a smooth upper surface and parallel sides, an elongated guide strip connected to one side of said playing board, said guide strip extending transversely of the direction of and lying in the same plane as said column strips, said guide strip having an upper surface uniformly divided into a plurality of spaces each of which is arranged alongside a different column strip, upright blocks mounted on said guide strip in each of the spaces thereof, said upright blocks extending upwardly in a direction away from said playing board, one of said upright blocks having a height equal to the length of the column strip alongside the guide strip space supporting said block, the remaining upright blocks being of progressively lesser heights than the first-mentioned block which heights correspond to the length of the selected numeral designating space of the column strips alongside the guide strip spaces supporting said blocks, and number blocks mounted on said playing board on each of the column strips thereof and extending in the same direction as said column strips, each of said column strips carrying at least one number block of a length equal to the length of the selected numeral designating spaces of said column strips.

4. An educational toy block set comprising a plurality of elongated column strips, each of said column strips having an upper surface containing a plurality of evenly spaced peg holes and at least one space of a predetermined length designating a selected numerical value, means connecting said column strips together in alongside adjacent relation whereby they constitute a playing board having a smooth upper surface and parallel sides, an elongated guide strip connected to one side of said playing board, said guide strip extending transversely of the direction of and lying in the same plane as said column strips, said guide strip having an upper surface uniformly divided into a plurality of spaces each of which is arranged alongside a different column strip, each of said spaces having a stake hole, upright stakes removably mounted in each of the stake holes in said guide strip, said upright stakes extending upwardly in a direction normal to said playing board, upright blocks mounted on each of said upright stakes over the spaces in said guide strip, the heights of said blocks being equal to the heights of the stakes on which they are mounted, one of said upright blocks having a height equal to the length of the column strip alongside the guide strip space supporting said block, the remaining upright blocks being of progressively lesser heights than the first-mentioned block which heights correspond to the length of the selected numeral designating space of the column strips alongside the guide strip spaces supporting said blocks, and number blocks mounted on said playing board on each of the column strips thereof and extending in the same direction as said column strips, each of said column strips carrying at least one number block of a length equal to the length of the selected numeral designating space of said column strips.

5. An educational toy block set comprising a plurality of elongated column strips, each of said column strips having an upper surface containing a plurality of evenly spaced peg holes and spaces of predetermined length designating selected numerical values, means connecting said column strips together in alongside adjacent relation whereby they constitute a playing board having a smooth upper surface and parallel sides, an elongated guide strip connected to one side of said playing board, said guide strip extending transversely of the direction of and lying in the same plane as said column strips, said guide strip having an upper surface uniformly divided into a plurality of spaces each of which is arranged alongside a different column strip in planar alignment therewith, each of said spaces having a stake hole the shape of which is different for each of said spaces, upright stakes removably mounted in each of the stake holes in said guide strip, said upright stakes extending upwardly in a direction normal to said playing board, upright blocks mounted on each of said upright stakes over the spaces in said guide strip, the heights of said blocks being equal to the heights of the stakes on which they are mounted, one of said upright blocks having a height equal to the length of the column strip alongside the guide strip space supporting said block, the remaining upright blocks being of progressively lesser heights than the first-mentioned block which heights correspond to the length of the numeral designating space of longest length on the column strips alongside the guide strip spaces supporting said blocks, and number blocks mounted on said playing board on each of the column strips thereof and extending in the same direction as said column strips, each of said column strips carrying at least one number block of a length equal to the length of the numeral designating space of longest length thereon.

6. An educational toy block set in accordance with claim 5 wherein each space of predetermined length on said column strips is colored differently than any other space of predetermined length.

7. An educational toy block set in accordance with claim 6 wherein the spaces in said guide strip are colored the same color as the space of longest length on the column strips arranged alongside said guide strip spaces.

8. An educational toy block set in accordance with claim 7 wherein said upright stakes and said upright blocks are colored the same colors as the spaces in said guide strip whereon they are mounted.

9. An educational toy block set in accordance with claim 8 wherein at least one of said number blocks on each of said column strips is colored the same color as the upright block on the guide strip which is aligned therewith.

10. An educational toy block set in accordance with claim 5 wherein the surfaces of said upright blocks and said number blocks have peg holes whereby said number blocks and said upright blocks may be connected to each other and to said playing board.

11. An educational toy block set in accordance with claim 5 wherein said means for connecting the column strips together comprises pegs carried in one side of each of said column strips, said pegs being adapted to engage holes in the side of the next adjacent column strip.

12. An educational toy block set in accordance with claim 11 wherein each of said column strips carries one more peg than the precedingly adjacent column strip.

References Cited in the file of this patent

UNITED STATES PATENTS

| | | |
|---|---|---|
| 1,400,887 | Liebman | Dec. 20, 1921 |
| 2,494,497 | Trapnell | Jan. 10, 1950 |
| 2,876,560 | Henley | Mar. 10, 1959 |

FOREIGN PATENTS

| | | |
|---|---|---|
| 321,251 | France | May 20, 1902 |